United States Patent [19]

Pounder et al.

[11] 4,170,953

[45] Oct. 16, 1979

[54] DETACHABLE AUTOMATIC PILOT FOR WHEEL-STEERED BOATS

[75] Inventors: Edwin J. Pounder, Altadena; John R. Casani, Pasadena, both of Calif.

[73] Assignee: Signet Scientific Company, El Monte, Calif.

[21] Appl. No.: 886,150

[22] Filed: Mar. 13, 1978

[51] Int. Cl.² ............................................. B63H 25/04
[52] U.S. Cl. .............................. 114/144 E; 74/388 PS; 318/588; 364/457
[58] Field of Search ............ 114/144 E, 144 R, 144 C; 318/588, 590, 591; 364/424, 457; 180/79.1; 74/388 PS, 494, 480 B, 484 R, 532; 224/29 E

[56] References Cited

U.S. PATENT DOCUMENTS

| | | | |
|---|---|---|---|
| 3,003,363 | 10/1961 | DeHart | 74/388 PS |
| 3,138,133 | 6/1964 | Hatch | 318/588 |
| 3,741,474 | 6/1973 | Kawada | 364/457 |
| 4,040,374 | 8/1977 | Greene | 114/144 E |

Primary Examiner—Reinhard J. Eisenzopf
Attorney, Agent, or Firm—Fulwider, Patton, Rieber, Lee, Utecht

[57] ABSTRACT

Apparatus for automatically steering a boat having a wheel-operated steering mechanism including a detachable motor-driven actuator arm engaging the spokes of the wheel. The actuator arm is connected through a clutch to a servo mechanism for driving the actuator. The servo mechanism is responsive to a heading set on a magnetometer or a preset apparent wind indication. The heading responsive circuitry includes an integrating loop to compensate for long-term changes in steering conditions.

13 Claims, 13 Drawing Figures

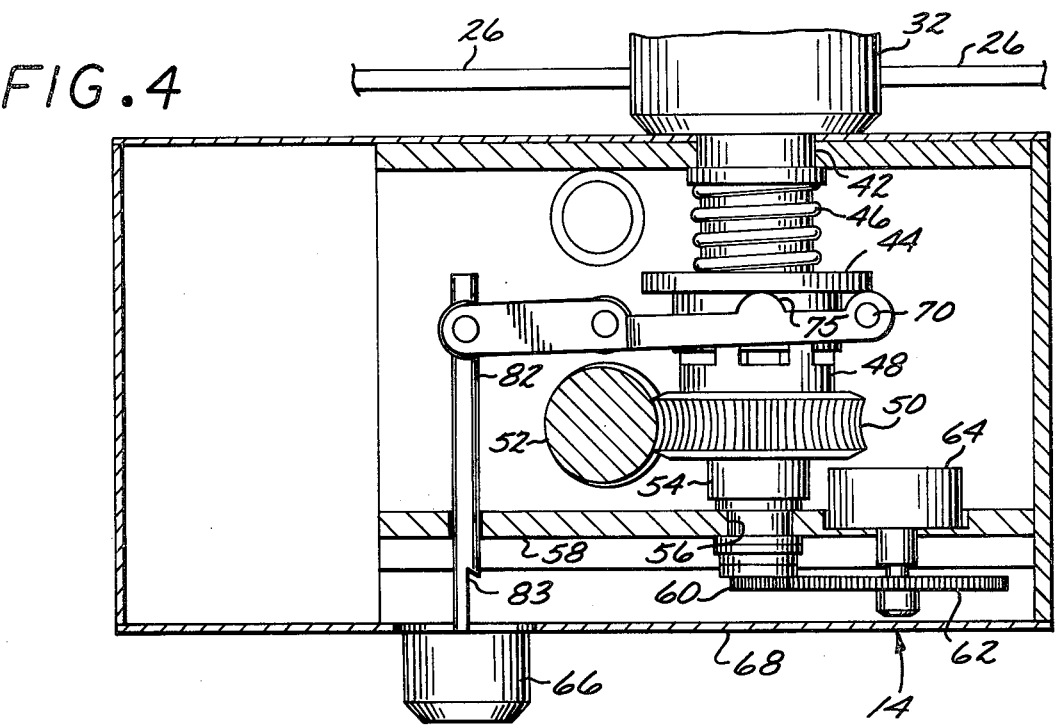
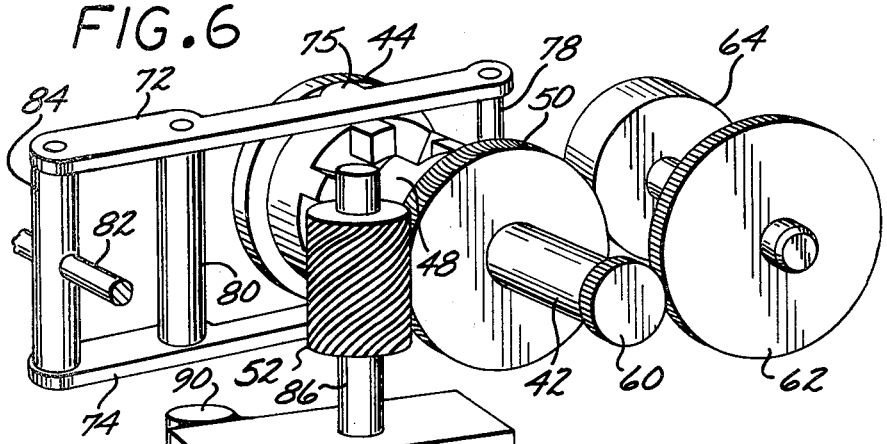
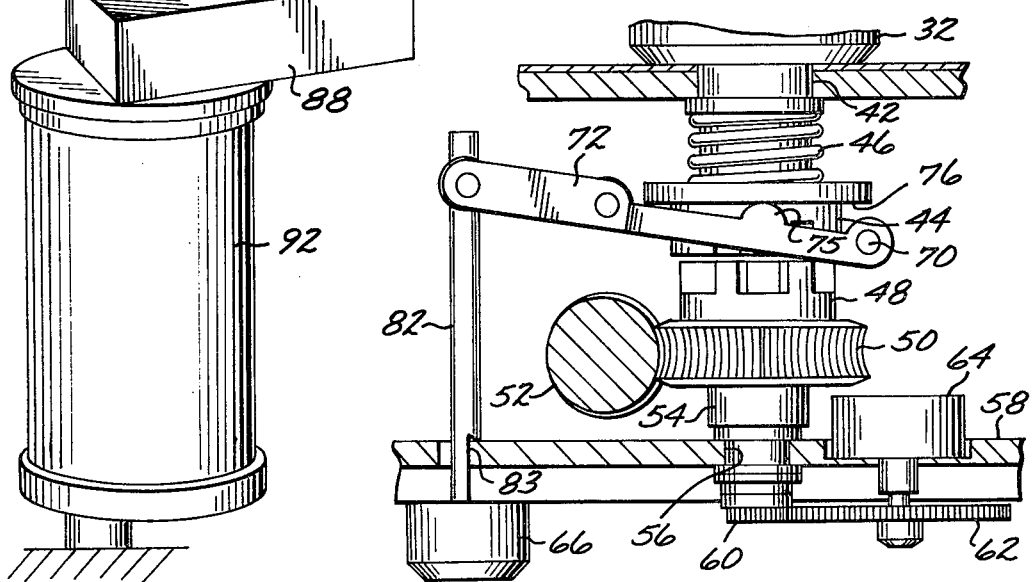

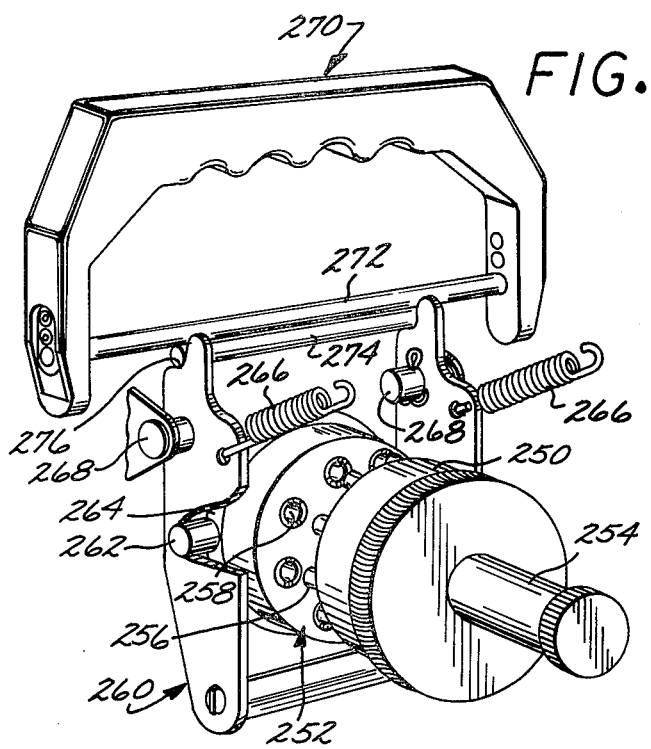
FIG. 7
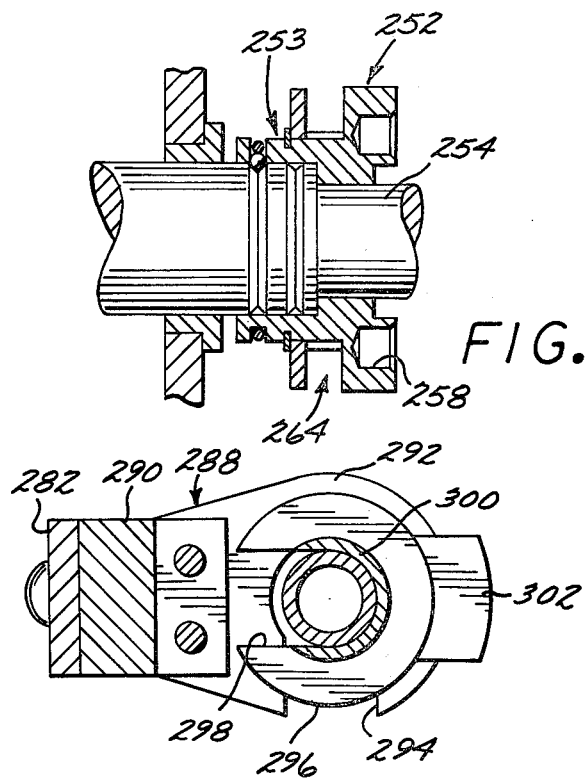
FIG. 7A
FIG. 9
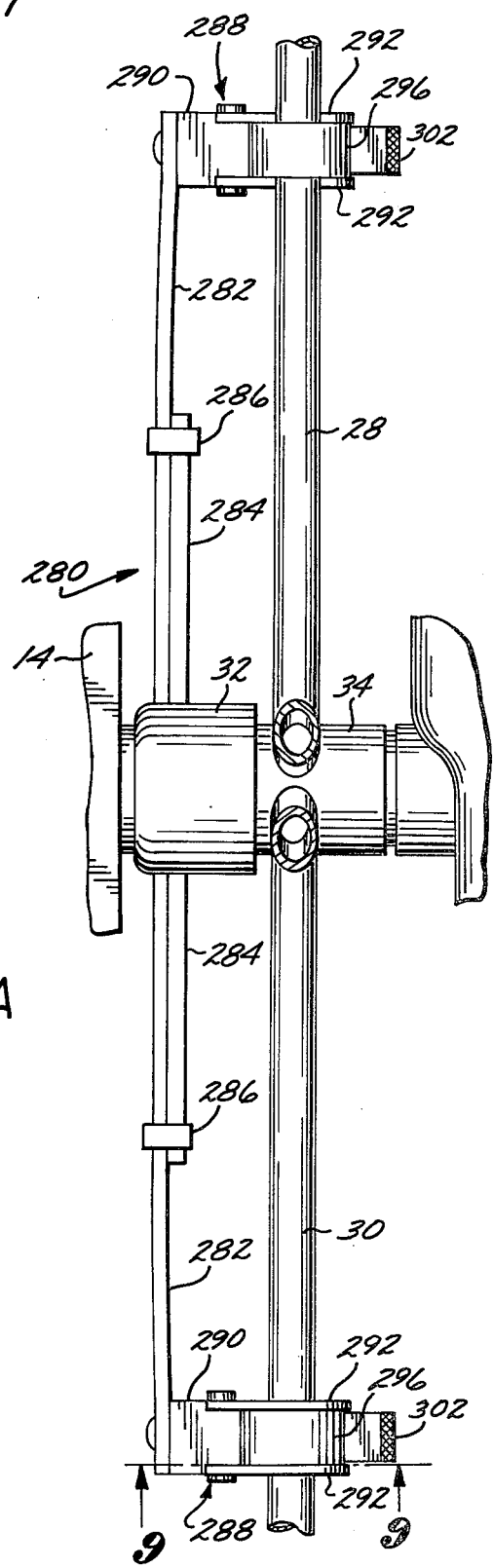
FIG. 8

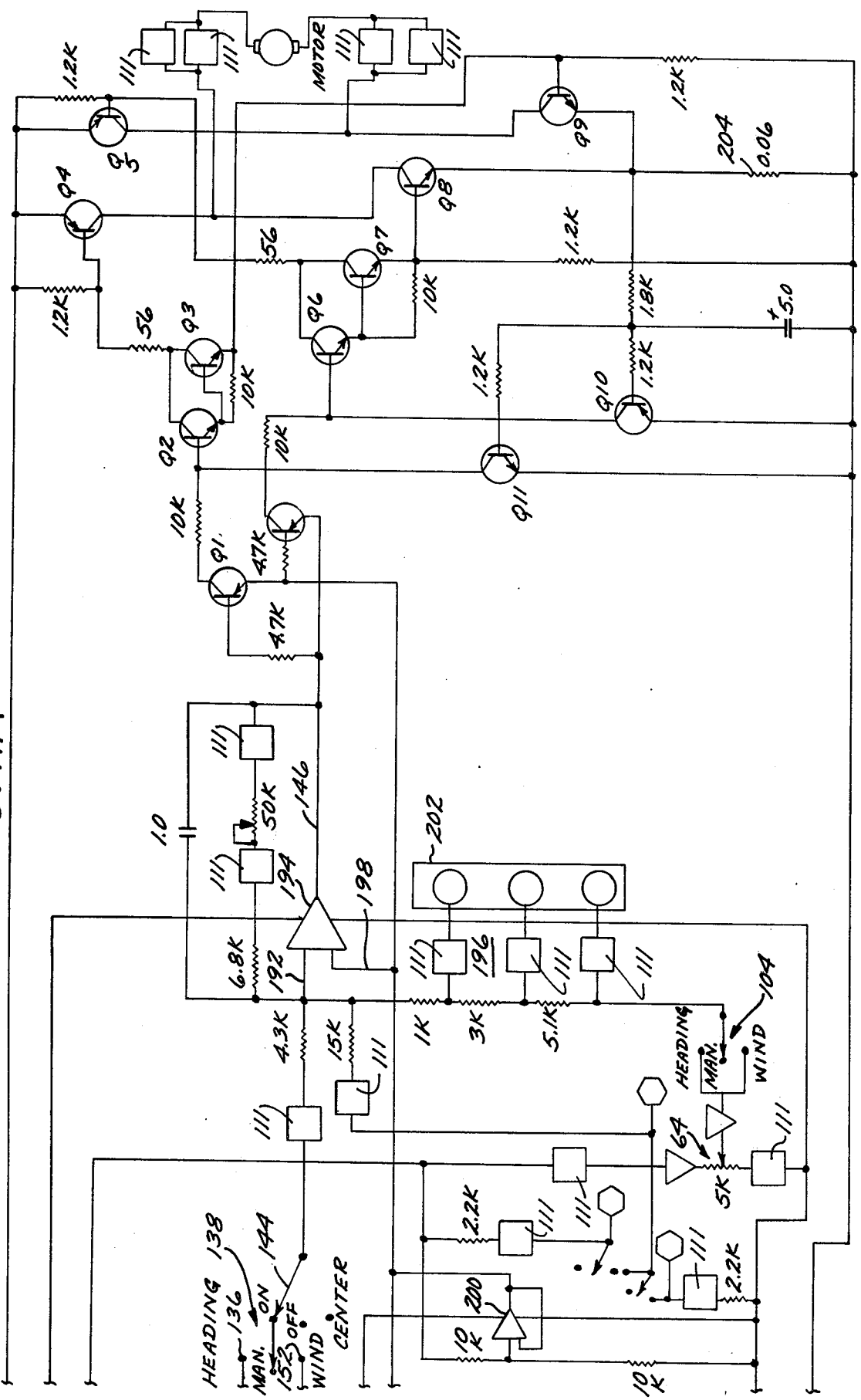

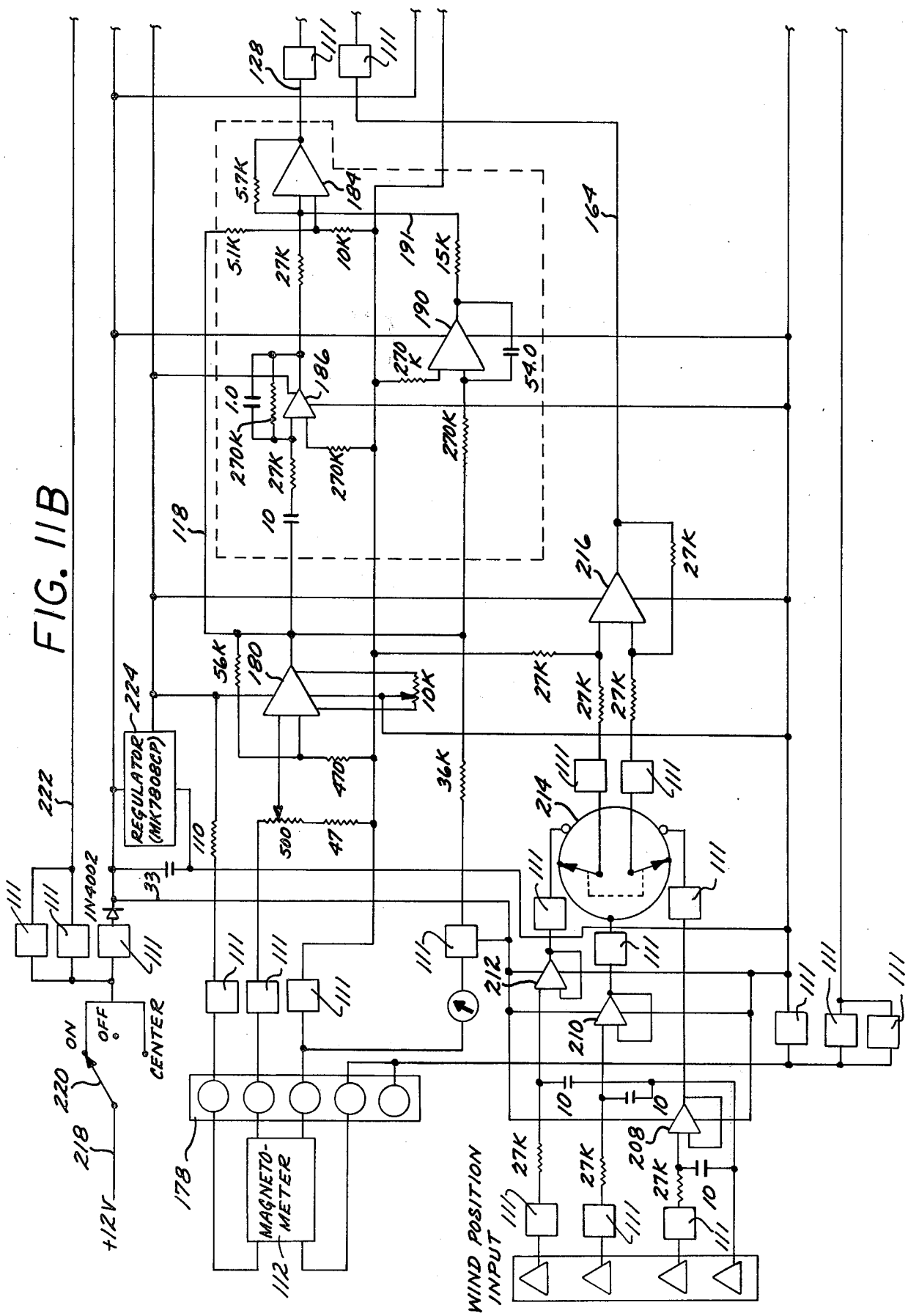

DETACHABLE AUTOMATIC PILOT FOR WHEEL-STEERED BOATS

BACKGROUND OF THE INVENTION

1. Field of the Invention

The present invention relates generally to automatic steering systems for boats, and more particularly, to such a system for detachable mounting on the wheel of a wheel-steered boat.

2. Description of the Prior Art

In the past, providing an automatic steering system or "automatic pilot" for a boat having wheel steering typically required extensive mechanical installation below the deck in the area of the rudder post of the boat. This requirement was mainly due to the fact that the below-deck rudder post was the only conveniently available place where the automatic pilot drive mechanisms could be attached to the rudder post.

In such typical prior art systems, the installed automatic pilot drive mechanisms not only occupied considerable space below deck but were relatively expensive both for equipment and installation.

Thus, there has long been a need for an automatic pilot for wheel-steered boats which did not require extensive below-deck installation and which was relatively inexpensive. The detachable automatic pilot of the present invention satisfies that need.

SUMMARY OF THE INVENTION

The automatic steering system of the present invention provides a self-contained unit which is detachably mounted directly on the steering wheel itself. The unit includes a main housing which is maintained in a fixed position with respect to the deck and wheel pedestal of the boat and an actuator assembly including an arm which is affixed to the spokes of the steering wheel. Automatic steering is effected by rotation of the actuator arm relative to the housing to turn the steering wheel.

Thus, the automatic steering system of the invention does not require modification of the existing steering mechanism, nor does it require any permanent installation of equipment. The housing has a heading magnetometer integrally attached and includes all of the servomechanism circuitry to effect automatic steering.

The servomechanism system included in the present system is responsive to a magnetometer heading to maintain a preset heading and includes position and rate feedback loops for improved steering response. In addition, an integrating loop is provided to compensate for relatively slow changes in steering conditions, such as "weather helm". The servomechanism system included in the automatic steering system of the invention further includes a means for maintaining a preset apparent wind angle, the actual apparent wind signal being derived from an external sensor.

Thus, the automatic steering system of the present invention provides a self-contained and detachable unit which is mounted directly on the existing steering wheel requiring no modification of the existing steering mechanism. The system of the invention is responsive both to preset headings and to preset apparent wind angles. Additional refinements include a quick-release clutch to disengage the automatic steering system and auxiliary controls for temporarily overriding the actuator mechanism.

These and other advantages of the system of the invention will be apparent from the following description of the drawings and detailed description.

BRIEF DESCRIPTION OF THE DRAWINGS

FIG. 4 is a cross sectional view of the housing showing the gear train and a first embodiment of the clutch mechanism;

FIG. 5 is a fragmentary cross sectional view of a first embodiment of the clutch mechanism shown in the disengaged position;

FIG. 6 is a diagrammatic perspective view of the gear train and a first embodiment of the clutch mechanism utilized in the system of the invention;

FIG. 7 is a diagrammatic perspective view of a second embodiment of a clutch mechanism utilized in the system of the invention;

FIG. 7a is a fractional cross sectional view of the detent mechanism of the second embodiment;

FIG. 8 is an enlarged partially sectioned view of a second embodiment of the actuator arm mounted on the spokes of the steering wheel;

FIG. 9 is a detailed side view of a second embodiment of the spoke-engaging mechanism of the actuator arm;

FIGS. 11a and 11b together are a detailed electrical schematic diagram of the servo mechanism utilized in the present invention.

DESCRIPTION OF THE PREFERRED EMBODIMENTS

Figure 1:
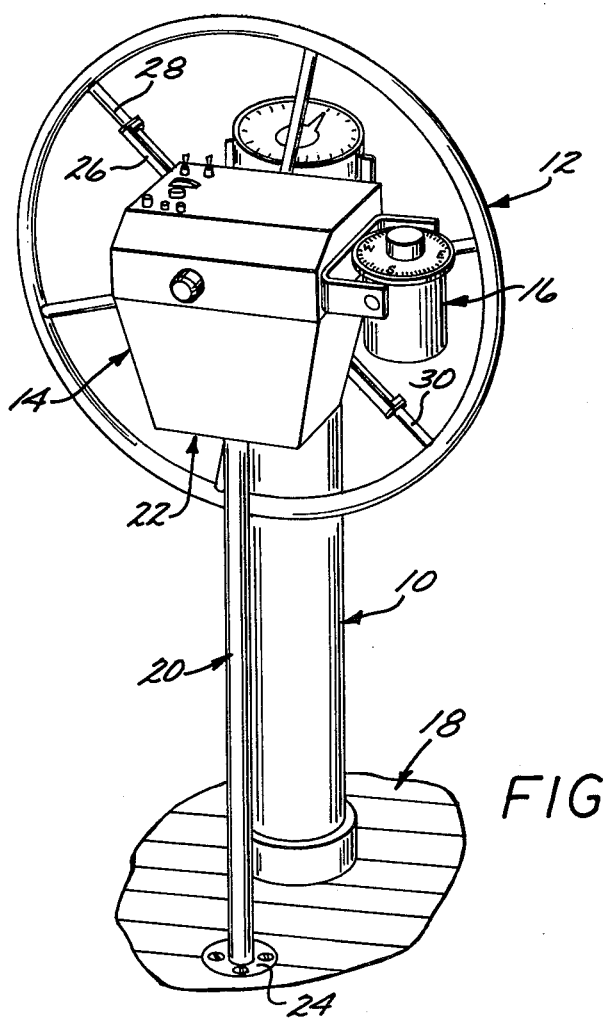
FIG. 1 is a perspective view of a pedestal and steering wheel shown with the housed automatic steering system of the invention installed on the wheel.

Turning now to the drawings, and particularly FIG. 1 thereof, a conventional pedestal 10 and wheel 12 are shown with the automatic steering system of the invention installed thereon. The automatic steering mechanism generally includes a housing 14 with an associated magnetometer 16 attached thereto. The housing 14 is maintained in a fixed position with respect to the pedestal 10 and deck 18 by a strut 20 extending from the bottom 22 of the housing 14 to a conventional bracket 24 installed in the deck 18 or other boat structure. Extending outwardly from the back of the housing 14 is an actuator assembly including actuator arms 26 which, in the illustrated embodiment, engage diametrically opposite spokes 28 and 30. The steering wheel 12 is turned by rotational movement of the actuator arms 26 with respect to the housing 14, as will be described in more detail below.

Figure 2:
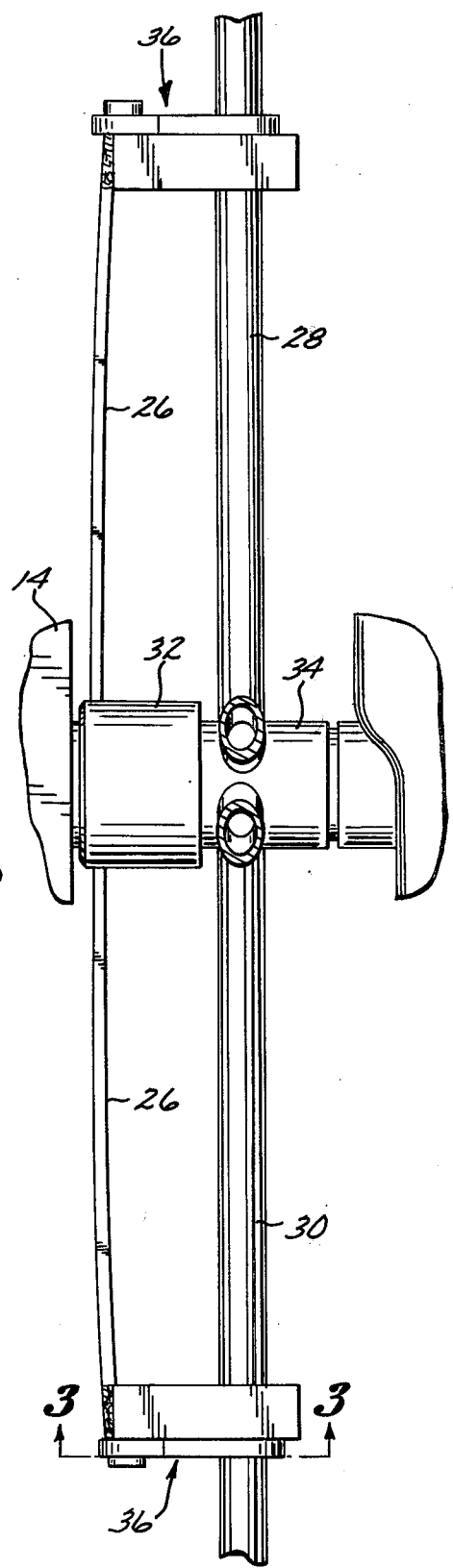
FIG. 2 is an enlarged, partially sectioned view of a first embodiment of the actuator arm mounted on the spokes of the steering wheel.
Figure 3:
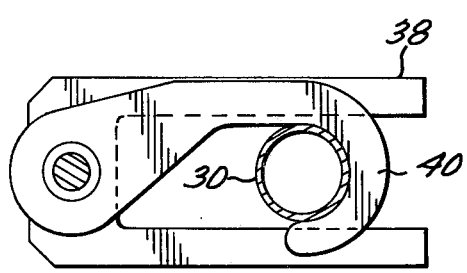
FIG. 3 is a detailed side view of a first embodiment of the spoke-engaging mechanism of the actuator arm.

FIG. 2 illustrates the method of attachment of a first embodiment of the actuator arms 26 to the spokes 28 and 30. More particularly, a steering wheel hub engaging sleeve 32 adapted to fit over a variety of hubs 34 for the steering wheel 12 by means of adapters so that the actuator arms 26 normally extend directly radially outward from the sleeve. The actuator arms 26 are biased or deformed toward the spokes 28 and 30 and are locked in place by a pair of hook mechanisms 36, of which a first embodiment thereof is more clearly illustrated in the detailed drawing of FIG. 3. At each end of the actuator arms 26, a U-shaped yoke 38 is mounted which fits over the spokes 28 and 30. A pivotally mounted hook 40 is then slipped around the spoke 30 and the actuator arms 26 are released so that the hook engages the spoke. Thus, the actuator arm 26 mechanism is securely attached to the spokes 28 and 30 but are quickly releasable by disengaging the hooks 40. The entire housing 14 and actuator arms 26 may then be easily installed or removed from the steering wheel 12 of the boat.

FIG. 4 illustrates part of the gear train and a first embodiment of the clutch release which drives the sleeve 32 and actuator arm 26. Thus, the sleeve 32 is rotationally attached to a drive shaft 42 which is rotationally fixed to a spring-loaded, movable clutch member 44. A spring 46 urges the clutch member 44 along the length of the drive shaft 42, into engagement with a corresponding clutch member 48, the pair forming a type of jam clutch. In FIG. 4, the clutch members 44 and 48 are shown in their engaged position, and the clutch member 48 is attached to a wheel gear 50 which is driven by a worm gear 52, which is more clearly illustrated in FIG. 6.

The clutch 48 and wheel gear 50 rotate freely on the drive shaft 42 which passes through a bushing 56 in a supporting wall 58 mounted within the housing 14. The shaft 54 on the opposite side of the wall 58 has an attached pinion gear 60 which drives a potentiometer gear 62 which has a drive shaft which passes through the wall 58 to rotate a potentiometer 64. The potentiometer 64 rotates in unison with the actuator arms 26 so that the changing resistance of the potentiometer 64 serves as an indication of rudder position, whether or not the clutch members 44 and 48 are engaged.

The clutch member 44 is disengaged, as illustrated in FIG. 5 by a camming lever operated by a manual push-button 66 which extends through the outer wall 68 of the housing 14. The camming lever is pivotally fixed about one end 70 and includes a pair of cam bars 72 and 74 which have cams 75 which engage a flange 76 of the clutch member 44. The cam bars 72 are supported at their pivotal end by a support bar 78 and along the length of the bars by another support pin 80. The camming levers are operated by an actuating pin 82 having a detent notch 83 and button 66 affixed to a pivotal, spring-biased support pin 84 mounted on the opposite end of the camming bars.

The drive train for the automatic steering mechanism includes a drive shaft 86 (FIG. 6) for the worm gear 52 which extends into a gear reduction box 88 driven by a drive shaft 90 from a D.C. electric motor 92. The total gear reduction between the rotational speed of the motor 92 and the final rotation of the actuator arms 26 is such that a relatively large amount of torque is developed on the wheel 42 (FIG. 1) for a relatively small motor size. Thus, the housing 14 can be made relatively small and still develop adequate torque on the wheel 12.

FIG. 7 is a diagrammatic perspective view of a second embodiment for a clutch mechanism for use with the system of the invention.

In this embodiment, a clutch member 250, which is driven by a pinion gear (not shown) engages a clutch member 252 rotationally fixed to a drive shaft 254 by means of a plurality of pins with corresponding mating bores 258. The clutch member 252 is movable toward and away from the driven clutch member 250 by means of a yoke 260 having associated pins 262 which engage a groove 264 of the clutch member 252. In this embodiment, the clutch member 252 is urged toward engagement with the driven clutch member 250 by means of a pair of springs 266 which draw the yoke 260 away from the clutch member 252 moving the detent mechanism 253 from one position to the other (FIG. 7a). The detent mechanism 253 provides sufficient holding force in either position so that additional springs are unnecessary.

The yoke 260 is mounted on a pair of pivots 268 and actuated to disengage the clutch members by means of a pivotally mounted actuating handle 270 which includes an actuating rod 272 on which is mounted a second rod 274 which engages a pair of notches 276 on the upper portion of the yoke 260 above the pivots 268. Pivoting the actuation handle in a direction which causes the yoke 260 to rotate about its pivots 268 disengages the clutch member 252 from the driven clutch member 250.

In this embodiment, the clutch mechanism is mounted within the housing 14 (FIG. 1) so that the actuating handle 270 straddles the top of the housing. Thus, to disengage the steering mechanism, it is only necessary to push the actuating handle 270 forward with respect to the housing 14. The clutch member 252 is mounted on the drive shaft 254 with a pair of spring and notch detents 253 (FIG. 7a). The clutch member 252 will be held in a released position by the detents but clutch member 252 will be reengaged by only slight backward pressure on the actuating handle 270. Thus, the second embodiment of the clutch mechanism which may be utilized in the present invention provides an actuating handle 270 which pivots the yoke 260 with relatively slight force, retains the clutch in the disengaged condition, but which will reengage the clutch with only slight reverse movement of the actuating handle 270. Further, the actuating handle 270 is relatively large and easily accessible to the boat operator and as an added advantage, may be used as a carrying handle for the steering mechanism when removed from the wheel 12.

FIG. 8 is an illustration of a second embodiment for an actuator arm 280 for mounting the steering mechanism onto the wheel 12 of the boat. In this embodiment, the actuator arm 282 includes a second strengthening bar 284 held in place on the first arm 282 by means of clips 286. The actuator arm 280 is held in place on the spokes 28 and 30 of the wheel by means of a second embodiment for the spoke-engaging hooks 288 which are best illustrated in FIG. 9. A mounting pad 290 is mounted on the actuator arms 282 and affixed to the mounting pads 290 on opposite sides thereof are a pair of retaining rings 292 which include slots 294 to admit the spoke 30 of the wheel.

Rotatably mounted within the retaining ring 292 is a locking ring 296 which also includes a slot 298. The locking ring 296 is rotatable so its slot 298 is coincident with the slots 294 in the retaining rings. The locking ring 296 is retained within the retaining rings 292 by means of flanges 300 which extend into the slots 294 of the retaining rings. A grip 302 is provided for rotation of the locking ring 296 within the confines of the retaining rings 292.

This construction permits the actuator arms 282 to be mounted on the spokes 28 and 30 without bending the actuator arms past the location they will have when in final position. To operate this mechanism, the sleeve 32 is mounted in place on the hub 34 of the wheel and the actuator arms 292 merely rotated with the spoke engaging hooks 288 in their open position so that the spokes 28 and 30 enter the coincident slots 298 and 294 and the locking ring 296 is then simply rotated into its locking position. Thus, the installation of the steering mechanism of the invention is greatly simplified.

Figure 10:
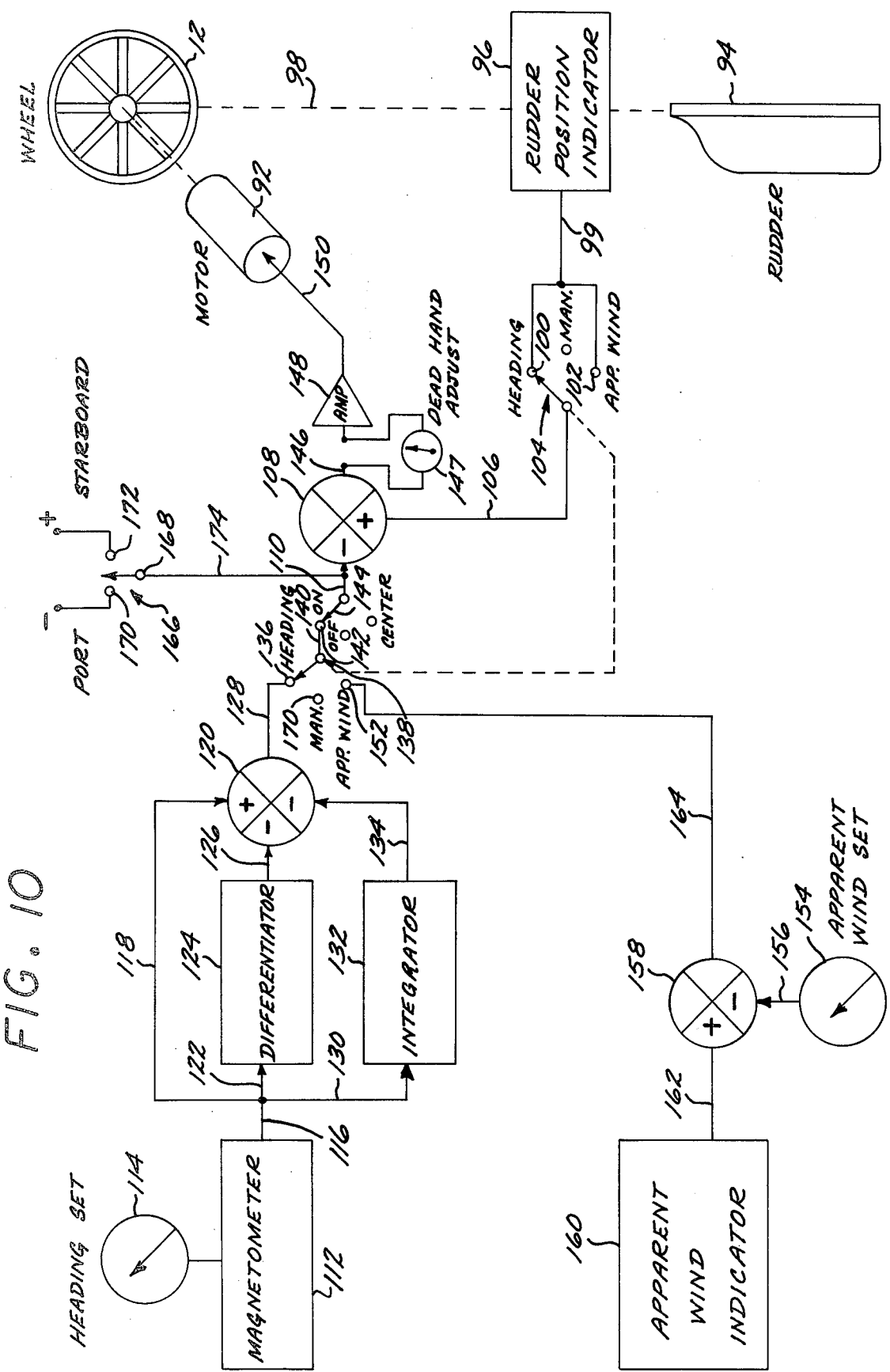
FIG. 10 is a diagrammatic block diagram of the servo mechanism system utilized in the invention.

FIG. 10 is a pictorial block diagram of the servomechanism system which drives the wheel 12 and subsequently a rudder 94. As briefly mentioned above, the rudder position indicator 96 is the potentiometer 64 which rotates in unison with the driven wheel 12, as indicated by the dotted line 98. The signal from the rudder position indicator 96 is fed over a line 99 to a heading terminal 100 or an apparent wind terminal 102 of one section of a three-position switch 104. The function of switch 104 will be described below. When switch 104 is either in the heading or apparent wind positions, the rudder position signal on line 98 will be fed through line 106 to the positive input of a summing junction 108. The negative input to the summing junction 108 on line 110 is derived from either a heading setting or an apparent wind setting as described briefly above.

To this end, a magnetometer 112 is provided which includes the diagrammatic manual desired heading setting unit 114. The magnetometer 112 is conventional and is available from Signet Scientific Co., 129 East Tujunga Avenue, Burbank, Calif. 91503, as Part No. MK40. The output of the magnetometer 112 on line 116 is an indication of the difference between the heading set on unit 114 and the actual direction to which the magnetometer 112 is oriented. Thus, a direction difference signal on line 116 will be developed for any deviation from the desired or set heading.

That direction difference signal is processed in three ways to compensate for the character of the signal on line 116. Therefore, the signal is connected through line 118 directly to the plus input of a summing junction 120 and connected through a differentiator 124 through line 126 to a first negative input to the summing junction 120 as a direction rate of change signal. The combination of the direct input to the positive input of summing junction 120 and the direction rate of change signal to a negative input of the summing junction forms a typical velocity-type servomechanism in which the output of the summing junction on line 128 is directly dependent upon the magnitude of the direction difference signal and inversely dependent upon the direction rate of change signal.

The direction difference signal is also connected through a line 130 to an integrator 132, the output of which is an average direction difference signal on line 134 which is connected to a second negative input to the summing junction 120. As the output of the integrator 132 is dependent upon the integration of the direction difference signal and its output on line 134 will compensate for relatively slow changes in the direction difference signal due to factors like slow changes in the torque on the wheel 12 due to "weather helm" or factors requiring a rudder offset for straight steering.

The summed direction error signal on line 128 is connected to a heading terminal 136 of a second three-position switch 138 which is ganged for rotation with switch 104. The pole terminal of switch 138 is connected through a line 140 to an "on" terminal 142 of a third three-position switch, the pole terminal 144 of which is connected to line 110 which is the negative input to summing junction 108. The summation of the rudder position signal on line 106 and the direction error signal on line 110 forms a command signal on line 146 which is connected through a deadhand adjustment potentiometer 147 and then amplified by power amplifier 148, the output of which is connected through line 150 to drive the motor 92. The deadhand adjustment can be used to inhibit constant turning of the wheel for minor instantaneous course changes due to sea conditions.

When it is desired to maintain a constant apparent wind angle with respect to the sails, the desired apparent wind angle is set on an apparent wind setting device 154, the output of which on line 156 is connected to the negative input of a summing junction 158. The actual apparent wind signal is developed by a conventional apparent wind indicator 160, the output of which on line 162 is the positive input to the summing junction 158. The apparent wind indicator 160 is available as conventional equipment from Signet Scientific Co. as Part No. MK76. The output of the summing junction 158 on line 164 is the difference between the set apparent wind and the actual apparent wind and is connected as an apparent wind angle difference signal to the apparent wind terminal of switch 138. Thus, when switch 138 is turned to the apparent wind terminal 152, the signal on line 110 at the negative input of summing junction 108 is the difference between desired and actual apparent wind. When switch 138 is turned to its apparent wind position, switch 104 is likewise turned and the rudder position signal is again connected through line 106 to the positive input of summing junction 108. The command signal on line 146 is then amplified by amplifier 148 to turn motor 92 to adjust the rudder 94 position to balance the error in apparent wind.

When the steering of the boat is under automatic control, there are occasions like the avoidance of other craft which may require that the boat be steered momentarily off its desired course. This is effected in the servo system of the invention by providing a two-position port and starboard switch 166, the pole terminal 168 of which may be momentarily connected to a port terminal 170 or a starboard terminal 172 which connects a plus or minus voltage, respectively, as a deviation signal through a line 174 to the negative input of summing junction 108. Thus, operation of the port or starboard switches will momentarily introduce a relatively large error signal into summing junction 108, causing the command signal on line 146 to drive the motor 92 and wheel 12 to move the boat to port or starboard by a fixed amount. In the presently preferred embodiment of the servo system of the invention, the port or starboard deviation signals introduce a fixed deviation from the desired course such as approximately 25° which is considered ample to avoid other craft and obstructions.

The port and starboard switch 168 may be located remotely from the housing. The servo mechanism can be disabled by moving the switches 138 and 104 to their center or manual terminal positions 176 and 178, respectively. With the switches 138 and 104 in the center position, the only input which can develop a command signal on line 146 is the port or starboard deviation signals which will turn the wheel 12 as long as switch 166 is in either position. When the switch 166 is released so that no voltage appears at the pole terminal 168, the wheel will maintain its driven position. Thus, the boat may be steered by use of the switch 166 from a remote location.

There are other occasions when it is desirable to have a rudder position signal but no heading or apparent wind signal. This is necessary when initially aligning the wheel 12 and rudder position for a straight line course. Switch 144 is therefore provided to disconnect the heading or apparent wind signals and connect only the rudder position signal to form the command signal 146. The output of the rudder position indicator 96 is such that when the wheel 12 is manually rotated to its center position, the output of the rudder position indicator will be "0", forming a "0" error signal on line 146 which will have driven the motor 92 to the center position. The wheel 12 is then in its center position and the clutch re-engaged.

FIGS. 11a and 11b together are a detailed electrical schematic diagram of a servo mechanism portion of the automatic steering mechanism of the present invention. The circuitry is constructed of integrated circuit chips mounted on a printed circuit board and the small squares represent external connections 111 to the circuit board for connections to potentiometers and the like. Basically, the circuitry follows the block diagram representation of FIG. 10. Thus, a magnetometer 112 is connected to a terminal block 178 and thence to the circuit board and its circuitry. The signal from the magnetometer is voltage-level adjusted through operational amplifier 180, the output of which follows the three paths described above.

There is a direct path through line 118 to the position terminal input 182 of another operational amplifier 184. The output of operational amplifier 180 is also connected to a differentiating circuit which includes operational amplifier 186 which has its output connected to a negative input terminal 188 of operational amplifier 184. The output of amplifier 180 is also connected to an integrating circuit which includes the operational amplifier 190 which has its output also connected through line 191 to the negative input terminal 188 of amplifier 184.

Continuing on FIG. 11a, the output of operational amplifier 184 corresponds to line 128 of FIG. 10 and is connected to the heading terminal 136 of switch 138. If the switch is in the heading position and the "on-off" center switch 144 is in the "on" position, the summed signal will be sent to a negative terminal input 192 of a summing operational amplifier 194.

The rudder position indicator 96 in FIG. 10, which corresponds to the potentiometer 64 drives the rudder position signal which is connected through switch 104 through a series of resistors 196 to the terminal 192 of amplifier 194. The polarity of the signals connected to terminal 192 are reversed, providing the positive and negative inputs to amplifier 194. The second terminal 198 of amplifier 194 is connected to a derived reference level generated by unity-coupled operational amplifier 200. The derived reference level is utilized to permit the remaining portions of the circuitry to reverse the polarity of the armature voltage of the motor 92 to permit rudder drive in both directions.

The series of resistors 196 have external connections 111 to a terminal board 202 which permits adjustment of the rudder position feedback signal to compensate for variations in the characteristics of wheel steering mechanisms. It should be appreciated that this arrangement could be replaced with a potentiometer for more continuous adjustment. The output of operational amplifier 194 on line 146 is the command signal and is connected through a series of driving transistors and power transistors which develop the armature voltage for the motor 92 to drive it in one direction or another, depending on the polarity of the error signal on line 146. Potentiometer 174 corresponds to the deadhand adjustment potentiometer 174 of FIG. 10.

To prevent damage to the motor should the steering mechanism be driven to a limit, and to avoid conventional limit switches which can, in a marine environment, easily corrode, an electrical limit provision is made so that the emitters of the power transistors Q8 and Q9 all pass through a 0.06 ohm resistor 204. If the armature current through the motor 92 should increase to too high a level due to the rudder hitting a limit, or if the steering torque becomes too great, the voltage across resistor 204 will drive transistors Q10 and Q11 into conduction and effectively limit the driving signals to the power transistors. Thus, the current through the armature of motor 92 and the power transistors is limited to a particular value which can only occur if the rudder reaches its limiting positions.

When the apparent wind angle is utilized, the wind position input from the indicator 160, usually mounted atop the mast, is connected through a terminal block 206 to the circuit board and the three main inputs are fed through unity amplifiers 208, 210 and 212 to provide isolation and thence to a potentiometer 214 which provides the apparent wind setting unit illustrated at 154 in FIG. 10. The potentiometer 214 matches the potentiometer in the mast top wind indicator and the continuous potentiometer with three taps and two wipers is conventional and is utilized in wind sensors provided by Signet Scientific Co. The output of the potentiometer 214 is fed through an amplifier 216 and a line 164 to the wind terminal 152 of the switch 138.

Power for the unit is provided by a 12-volt line 218 which is connected through a switch 220 which operates in conjunction with the switch 144. The power for the power and drive transistors is fed through a line 222 directly while the power for the operational amplifiers is first fed through a regulator 224 to provide stable operation.

Thus, the automatic steering mechanism of the present invention provides two modes of operation, one using a bearing set on a magnetometer and the other steering by a set apparent wind angle. A number of further features are provided, such as temporary direction changes through the use of a readily available switch which may also be used for manual operation of the system. The entire system is mounted in a housing 14 which is quickly detachably mounted on the steering wheel 12 itself by means of a sleeve 32 and attached actuating arms 26. Furthermore, a quick-releasing clutch is provided for emergencies.

While a presently preferred embodiment of the invention has been described in detail above, it should be appreciated that numerous changes in the system, particularly in the electrical circuitry, may be made which would be within the scope of the invention. Therefore, the invention is not to be limited except by the following claims.

We claim:

1. An apparatus for automatically steering a boat having a wheel-operated steering mechanism operatively connected to a rudder, said wheel having a plurality of spokes connected to a central hub, said apparatus comprising:
   a housing adapted to be maintained in a fixed position relative to a deck of said boat;
   an actuator assembly having a central portion fitted about said central hub of said wheel, and further having a pair of actuator arms having outer extremities adapted to be biased toward and affixed to a pair of said spokes of said wheel, said extremities being detachable from said spokes whereby said apparatus may be removed from said wheel, said actuator assembly being rotatable relative to said housing to turn said wheel;

means for sensing the difference between a desired direction and an actual direction to generate an error signal;

means for comparing a rudder position signal with said error signal to generate a difference signal, and for generating a command signal in response to said difference signal;

means for rotating said actuator assembly in response to said command signal whereby said rudder is moved in a direction to steer said boat in said desired direction; and clutch means positioned between said means for rotating and said actuator assembly for selectively disengaging said means for rotating from said wheel.

2. The apparatus defined in claim 1, wherein:
said extremities of said arms have hook mechanisms for engaging said spokes of said wheel.

3. The apparatus defined in claim 1, wherein:
said means for rotating said actuator assembly includes a motor responsive to said command signals and a gear train for transferring motor rotation to said actuator assembly.

4. The apparatus defined in claim 3, including:
clutch means positioned between said means for rotating and said actuator assembly for effectively disengaging said apparatus from said wheel.

5. The apparatus defined in claim 1, wherein:
said housing is maintained fixed in position with respect to said deck by means of a strut depending into engagement with said deck.

6. The apparatus defined in claim 5, wherein:
said means for rotating said actuator assembly includes a motor responsive to said command signals and a gear train for transferring motor rotation to said actuator assembly.

7. An apparatus for automatically steering a boat having a wheel-operated steering mechanism operatively connected to a rudder, said wheel having a plurality of spokes connected to a central hub, said apparatus comprising:

a housing adapted to be arranged adjacent said wheel;

a strut connected to said housing and adapted to be attached to a deck of said boat to maintain said housing in fixed position with respect to said deck;

an actuator assembly having a central portion fitted about said central hub of said wheel, and further having a pair of actuator arms having outer extremities adapted to be biased toward and affixed to a pair of said spokes of said wheel, said extremities being detachable from said spokes whereby said apparatus may be removed from said wheel, said actuator assembly being rotatable relative to said housing to turn said wheel;

means for sensing the difference between a desired direction and an actual direction to generate an error signal;

coupling means for coupling said rudder to said actuator assembly for generating a rudder position signal;

means for comparing said rudder position signal with said error signal to generate a difference signal, and for generating a command signal in response to said difference signal;

means for rotating said actuator assembly including a motor responsive to said command signal, and a gear train for transferring rotation of said motor to said actuator assembly whereby said rudder is moved in a direction to steer said boat in said desired direction; and clutch means positioned between said means for rotating and said actuator assembly for selectively disengaging said means for rotating from said wheel.

8. An apparatus for automatically steering a boat having a wheel-operated steering mechanism operatively connected to a rudder, said wheel having a plurality of spokes connected between a rim and a central hub, said apparatus comprising:

a housing adapted to be arranged adjacent said wheel;

an elongated element connected to said housing and adapted to be attached to a deck of said boat below said wheel to maintain said housing in fixed position with respect to said deck;

an actuator assembly having a central portion fitted about said central hub of said wheel, and further having a pair of actuator arms having outer extremities adapted to be detachably mounted to a pair of said spokes of said wheel radially inwardly of said rim, said extremities being detachable from said spokes whereby said apparatus may be removed from said wheel, said actuator assembly being rotatable relative to said housing to turn said wheel;

servomechanism means including means for sensing a desired direction and an actual direction and generating a direction difference signal in response thereto; means for differentiating said direction difference signal to generate a direction rate of change signal; means for integrating said direction difference signal to generate an average direction difference signal; means for summing said direction difference signal, said direction rate of change signal and said average direction difference signal to generate a composite direction error signal; means for sensing the rudder position and generating a rudder position signal in response thereto; and means for summing said direction error signal and said rudder position signal to generate a command signal in response thereto;

operator means for rotating said actuator assembly in response to said command signal whereby said rudder is moved in a direction to steer said boat in said desired direction; and clutch means positioned between said operator means and said actuator assembly for selectively disengaging said operator means from said wheel thereby to enable manual steering of the boat.

9. The servo mechanism defined in claim 8, including:
means for setting a desired apparent wind angle with respect to said boat;

means for sensing actual apparent wind angle with respect to said boat;

means for summing said desired apparent wind angle and said actual apparent wind angle to generate an apparent wind angle difference signal in response thereto; and means for selectively connecting said direction error signal or said apparent wind angle difference signal to said means for summing with said rudder position signal to generate a command signal in response thereto.

10. The servo mechanism defined in claim 8, including:
   means for selectively connecting a deviation signal to said means for combining said direction error signal and rudder position signal to generate a command signal which causes said rudder to be moved a predetermined angle whereby said boat is steered in a direction which deviates from said desired direction by a predetermined angle.

11. The servo mechanism defined in claim 10, including:
   means for setting a desired apparent wind angle with respect to said boat;
   means for sensing actual apparent wind angle with respect to said boat;
   means for summing said desired apparent wind angle and said actual apparent wind angle to generate an apparent wind angle difference signal in response thereto; and
   means for selectively connecting said direction error signal or said apparent wind angle difference signal to said means for summing with said rudder position signal to generate a command signal in response thereto.

12. The servo mechanism defined in claim 11, including:
   means for selectively disconnecting both said direction error signal and said apparent wind difference signal from said means for combining said signals to generate a command signal, whereby said means for generating a deviation signal is directly applied to said combining means to generate said command signal.

13. An apparatus for automatically steering a boat having a wheel-operated steering mechanism operatively connected to a rudder, said wheel having a plurality of spokes connected to a central hub, said apparatus comprising:
   a housing adapted to be maintained in a fixed position relative to a deck of said boat;
   an actuator assembly having a central portion fitted about said central hub of said wheel and further having a pair of actuator arms having outer extremities, said outer extremities each including a fixed ring and an adjacent rotatable ring characterized by slots alignable to receive one of said spokes in said rings, said rotatable ring being rotatable to move said slots out of alignment for retaining said one of said spokes within said rings, said actuator assembly being rotatable relative to said housing to turn said wheel;
   means for sensing the difference between a desired direction and an actual direction to generate an error signal;
   means for comparing a rudder position signal with said error signal to generate a difference signal, and for generating a command signal in response to said difference signal;
   means for rotating said actuator assembly in response to said command signal whereby said rudder is moved in a direction to steer said boat in said desired direction; and
   clutch means positioned between said means for rotating and said actuator assembly for selectively disengaging said means for rotating from said wheel.

* * * * *